(12) United States Patent
Hossain et al.

(10) Patent No.: US 12,438,493 B2
(45) Date of Patent: Oct. 7, 2025

(54) SYSTEM AND METHOD FOR TORQUE LIMITING OF DC MACHINES

(71) Applicant: Steering Solutions IP Holding Corporation, Saginaw, MI (US)

(72) Inventors: Md Abid Hossain, Saginaw, MI (US); Ashish Verma, Saginaw, MI (US); Thomas J. Stutts, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 147 days.

(21) Appl. No.: 18/515,802

(22) Filed: Nov. 21, 2023

(65) Prior Publication Data

US 2025/0167719 A1 May 22, 2025

(51) Int. Cl.
*H02P 29/032* (2016.01)
*B62D 5/04* (2006.01)

(52) U.S. Cl.
CPC .......... *H02P 29/032* (2016.02); *B62D 5/0409* (2013.01); *B62D 5/046* (2013.01)

(58) Field of Classification Search
CPC ...... H02P 29/032; B62D 5/0409; B62D 5/046
See application file for complete search history.

(56) References Cited

U.S. PATENT DOCUMENTS

| 3,947,738 A * | 3/1976 | Oliver | ...................... H02P 7/04 388/903 |
| 10,530,282 B2 | 1/2020 | Pramod et al. | |
| 11,290,042 B2 | 3/2022 | Pramod et al. | |
| 2015/0288310 A1* | 10/2015 | Pace | ...................... H02P 21/22 318/400.15 |
| 2017/0346424 A1* | 11/2017 | Pramod | ................ B62D 5/0481 |

* cited by examiner

*Primary Examiner* — Bickey Dhakal
(74) *Attorney, Agent, or Firm* — Dickinson Wright PLLC

(57) ABSTRACT

Technical solutions are described for controlling a brushed direct current (DC) motor, including: determining, based on one of a motor current command or an actual motor current, a brush voltage drop across a set of brushes of the brushed DC motor; determining, based on the brush voltage drop, at least one of: a first torque limit based on a supply current value not exceeding a supply current limit, and a second torque limit based on a controller supply voltage value not exceeding a maximum available voltage; determining a final torque limit based on the at least one of the first torque limit and the second torque limit; determining a limited torque command based on a torque command and not to exceed the final torque limit; determining a voltage command based on the limited torque command; and applying a DC voltage to the brushed DC motor based on the voltage command.

20 Claims, 13 Drawing Sheets

SYSTEM AND METHOD FOR TORQUE LIMITING OF DC MACHINES

BACKGROUND

The present disclosure relates to methods and systems for operating DC machines, such as brushed DC motors. More specifically, the present disclosure relates to methods and systems for limiting torque of DC machines.

Brushed DC motors are used in various applications. One such application for brushed DC motors is in power steering systems for vehicles. Significant advantages of brushed DC motors, when compared with alternatives such as AC motors, include low-cost components, less circuitry, simplicity, and ease of control.

Active speed control techniques may be used with brushed DC motors to reduce noise and provide better customer performance. There are two primary methods used to control speed: one with a speed-to-torque controller and another with a speed-to-voltage controller.

Several different operating constraints, such as available voltage, supply current limits, and motor current limits, may be applicable for operation of a DC machine.

SUMMARY

According to one or more embodiments, a method of controlling a brushed direct current (DC) motor includes: determining, based on one of a motor current command or an actual motor current, a brush voltage drop across a set of brushes of the brushed DC motor; determining, based on the brush voltage drop, at least one of: a first torque limit based on a supply current value not exceeding a supply current limit, and a second torque limit based on a controller supply voltage value not exceeding a maximum available voltage; determining a final torque limit based on the at least one of the first torque limit and the second torque limit; determining a limited torque command based on a torque command and not to exceed the final torque limit; determining a voltage command based on the limited torque command; and applying a DC voltage to the brushed DC motor based on the voltage command.

According to one or more embodiments, a motor control system is provided. The motor system includes: a brushed direct current (DC) motor having a set of brushes; a voltage regulator configured to apply a DC voltage to the brushed DC motor based on a voltage command; and a controller configured to: determine, based on one of a motor current command or an actual motor current, a brush voltage drop across the set of brushes of the brushed DC motor; determine, based on the brush voltage drop, at least one of: a first torque limit based on a supply current value not exceeding a supply current limit, and a second torque limit based on a controller supply voltage value not exceeding a maximum available voltage; determine a final torque limit based on the at least one of the first torque limit and the second torque limit; determine a limited torque command based on a torque command and not to exceed the final torque limit; determine a voltage command based on the limited torque command; and transmit the voltage command to the voltage regulator.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The present disclosure provides an anti-windup control strategy of a speed-to-torque controller for operating a brushed DC motor. The motor torque may be limited to satisfy several different operating constraints. The present disclosure addresses three such operating constraints, including a maximum available voltage, a supply current limit, and a motor current limit. Equations relating these operating constraints to the maximum and minimum torque are derived. The derivations change with the system state and provide active limiting and maximum capability.

In some embodiments, torque limits corresponding to the maximum available voltage and the supply current limit may be determined based on a brush voltage drop across a set of brushes of the brushed DC motor. The present disclosure provides for determining the brush voltage drop based on a motor current command or an actual motor current; and determining, based on the brush voltage drop, torque limit values that correspond to the brushed DC motor satisfying each of the supply current limit, and the motor current limit. The systems and methods of the present disclosure are compared with alternative techniques, such as a technique assuming the brush voltage drop to be a constant with respect to the motor current, and a technique that uses an iterative solver to determine roots of a polynomial equation to determine a motor current limits corresponding to the maximum available voltage and the supply current limit. The systems and methods of the present disclosure are shown to provide enhanced output torque while satisfying the operating constraints, and with substantially less computational burden when compared to alternative techniques that use an iterative solver.

Figure 1:
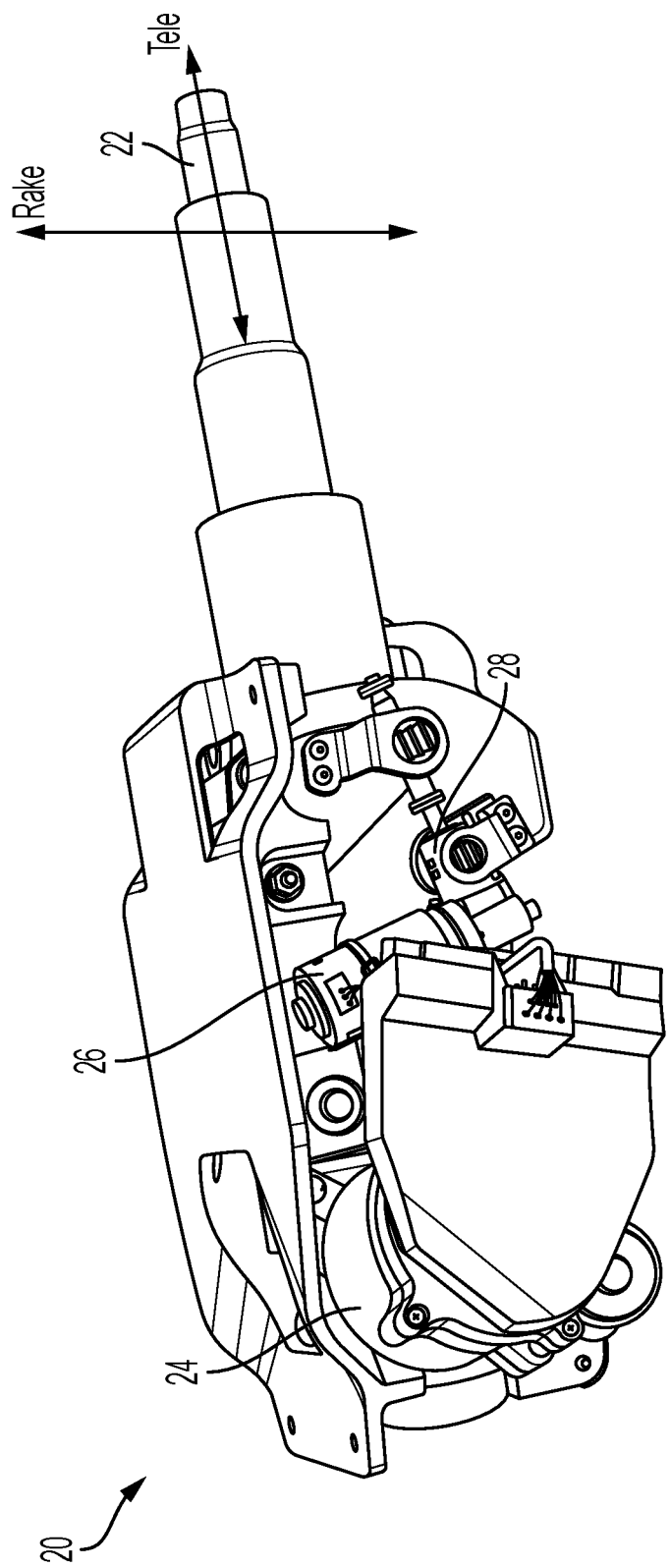
FIG. 1 shows a column position module (CPM) of a steering system in a vehicle, according to aspects of the present disclosure.

Referring now to the figures, where the technical solutions will be described with reference to specific embodiments, without limiting same, FIG. 1 shows an exemplary embodiment of a column position module (CPM) 20 of a steering system in a vehicle, and which may utilize the disclosed systems and methods for controlling a DC motor.

The CPM 20 includes a steering shaft 22 configured to attach to a steering wheel, which may also be called a hand wheel, that can be used by a person for steering a vehicle. The CPM 20 includes a steering actuator 24 attached to the steering shaft. The steering actuator 24 may supplement the person's application of force in order to provide power-assisted steering function. The CPM 20 also includes a telescoping actuator motor 26 configured to control an axial position of the handwheel by moving the steering shaft 22 in an axial direction. The CPM 20 also includes a rake actuator motor 28 configured to control a vertical position of the handwheel by moving an end the steering shaft in a radial direction.

Any or all of the steering actuator 24, the telescoping actuator motor 26 and/or the rake actuator motor 28 may include brushed DC motors and may be controlled using the systems and methods of the present disclosure. However, the systems and methods of the present disclosure may be used with brushed DC motors in other applications in a vehicle, such as for window or lock actuators. The systems and methods of the present disclosure are not limited to use in vehicles, and may be used with brushed DC motors in a variety of different applications.

Figure 2:
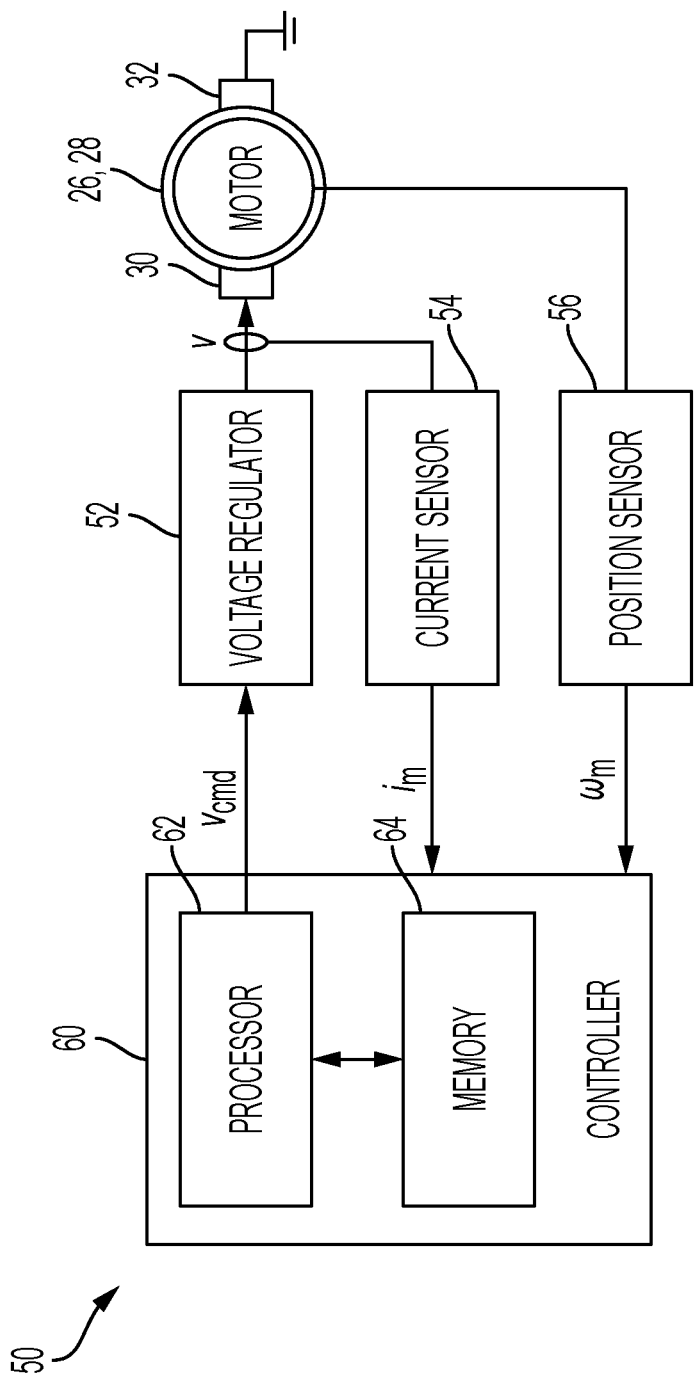
FIG. 2 shows a schematic block diagram of a system for controlling a brushed DC motor, according to aspects of the present disclosure.

FIG. 2 shows a schematic block diagram of a system 50 for controlling a DC motor 26, 28. In some embodiments, and as shown in FIG. 2, the DC motor 26, 28 is a brushed DC motor having a set of brushes 30, 32 for transmitting DC current from a stationary terminal to a rotor winding of the DC motor 26, 28. The set of brushes 30, 32 includes a first brush 30 configured to be connected to a power source for receiving a DC current. The set of brushes 30, 32 also includes a second brush 32 configured to be connected to a current sink, such as a ground terminal.

The system 50 includes a controller 60. The controller 60 may include any suitable controller, such as an electronic control unit or other suitable controller. The controller 60 may be configured to control, for example, the various functions of the steering system and/or various functions of a vehicle. The controller 60 may include a processor 62 and a memory 64. The processor 62 may include any suitable processor, such as those described herein. Additionally, or alternatively, the controller 60 may include any suitable number of processors, in addition to or other than the processor 62. The memory 64 may comprise a single disk or a plurality of disks (e.g., hard drives), and includes a storage management module that manages one or more partitions within the memory 64. In some embodiments, memory 64 may include flash memory, semiconductor (solid state) memory or the like. The memory 64 may include Random Access Memory (RAM), a Read-Only Memory (ROM), or a combination thereof. The memory 64 may include instructions that, when executed by the processor 62, cause the processor 62 to, at least, control various aspects of the vehicle. Additionally, or alternatively, the memory 64 may include instructions that, when executed by the processor 62, cause the processor 62 to perform functions associated with the systems and methods described herein.

The controller 60 may be operably connected to a voltage regulator 52. The voltage regulator 52 may be configured to apply a DC voltage v to the first brush 30 of the DC motor 26, 28. The voltage regulator 52 may generate the DC voltage v based on a voltage command $v_{cmd}$ from the controller 60.

In some embodiments, and as shown in FIG. 2, the system 50 may include a current sensor 54 configured to measure the DC current supplied to the DC motor 26, 28 and to transmit a motor current signal $i_m$ to the controller 60, representing an actual motor current in a winding of the DC motor 26, 28. Additionally or alternatively, and as also shown in FIG. 2, the system 50 may include a position sensor 56 and configured to measure a rotational position of the DC motor 26, 28 and to transmit a motor position signal $\omega_m$ to the controller 60.

In some embodiments, the controller 60 may perform the methods described herein. However, the methods described herein as performed by the controller 60 are not meant to be limiting, and any type of software executed on a controller or processor can perform the methods described herein without departing from the scope of this disclosure. For example, a controller, such as a processor executing software within a computing device, can perform the methods described herein.

Figure 3:
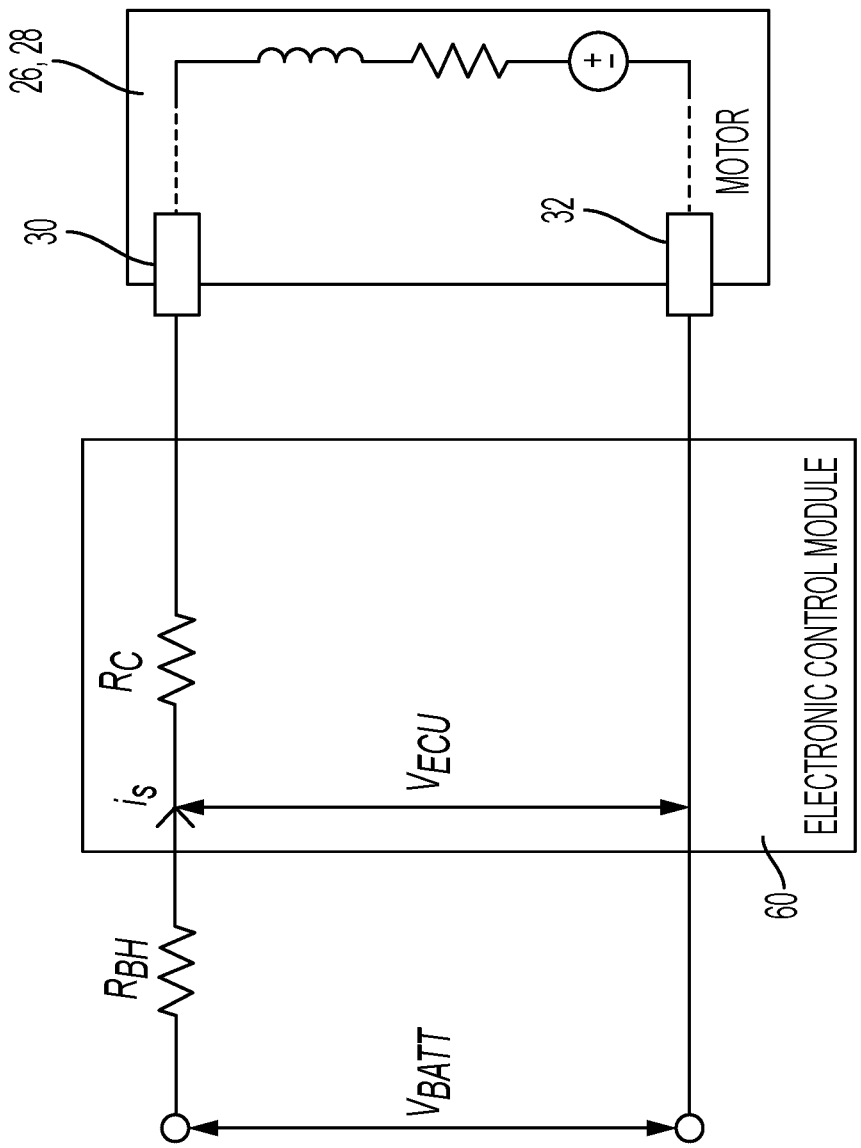
FIG. 3 shows an electrical schematic diagram of a control system for a brushed DC motor, according to aspects of the present disclosure.

FIG. 3 shows an electrical schematic diagram of a control system for a brushed DC motor 26,28. As shown, the controller 60 and the DC motor 26, 28 define a voltage loop having a supply current $i_s$, and defining a battery voltage $V_{BATT}$ across a power source (not shown), and a controller supply voltage $V_{ECU}$ across the controller 60. As shown in FIG. 3, the voltage loop includes a battery harness resistance $R_{BH}$ in a current path between the battery and the controller 60. The voltage loop also includes a controller input resistance $R_C$ within the controller 60, in series with the battery harness resistance $R_{BH}$. The DC motor 26, 28 is shown in FIG. 3 as including an inductor, a resistor, and a voltage source, connected in series and representing winding inductance, coil resistance, and back-EMF, respectively.

Figure 4:
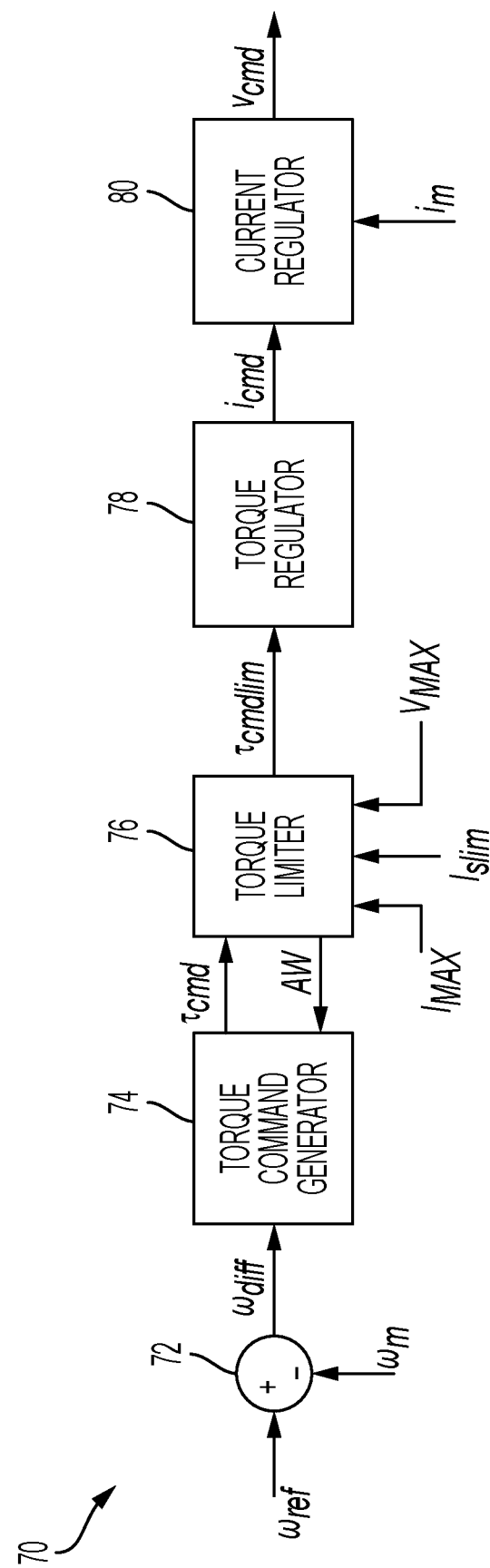
FIG. 4 shows a schematic block diagram of a motor controller for operating a DC motor, according to aspects of the present disclosure.

FIG. 4 shows a schematic block diagram of a motor controller 70 for operating a DC motor, according to aspects of the present disclosure. The motor controller 70 is configured as a speed-to-torque controller. However, the principles of the present disclosure may be applied to other controller configurations.

The motor controller 70 includes a subtractor 72 configured to subtract the motor speed $\omega_m$ from a speed command signal $\omega_{ref}$, and to compute a speed difference signal $\omega_{diff}$ representing the difference between the speed command signal $\omega_{ref}$ and the motor speed $\omega_m$. The motor controller 70 also includes a torque command generator 74 that configured to generate a torque command signal $\tau_{cmd}$ based on the speed difference signal $\omega_{diff}$. The torque command generator 74 may use a proportional-integral (PI) control loop to generate the torque command signal $\tau_{cmd}$, however, other control techniques may be used, such as a proportional-integral-derivative (PID) control loop, or a lookup table.

The motor controller 70 also includes a torque limiter 76 configured to generate a limited torque command $\tau_{cmdlim}$ based on the torque command signal $\tau_{cmd}$. The torque limiter 76 also takes, as inputs, three operating constraints for operating the DC motor 26, 28, including:

a motor current limit $I_{MAX}$;
a supply current limit value $I_{slim}$; and
a maximum available voltage value $V_{MAX}$.

The torque limiter 76 also generates an anti-windup signal AW, indicating that the limited torque command $\tau_{cmdlim}$ is being limited to cause the DC motor 26, 28 to satisfy at least one of the operating constraints $I_{MAX}$, $I_{slim}$, $V_{MAX}$. The anti-windup signal AW is supplied from the torque limiter 76 to the torque command generator 74.

The motor controller 70 also includes a torque regulator 78 configured to generate a current command $i_{cmd}$ based on the limited torque command $\tau_{cmdlim}$. In some embodiments, the torque regulator 78 generates the current command $i_{cmd}$ by dividing the limited torque command $\tau_{cmdlim}$ by a back-EMF constant K.

The motor controller 70 also includes a current regulator 80 that is configured to generate a voltage command $v_{cmd}$ based on the current command $i_{cmd}$. In some embodiments, and as shown in FIG. 4, the current regulator 80 takes, as an input, the motor current signal $i_m$. The current regulator 80 may use a control loop, such as a PI control loop to compute the voltage command $v_{cmd}$ based on a difference between the current command $i_{cmd}$ and the motor current signal $i_m$. Alternatively or additionally, the current regulator 80 may use a reference model, such as an equation or a lookup table to determine the voltage command $v_{cmd}$ based on the current command $i_{cmd}$ and the motor current signal $i_m$.

Equations (1)-(2), below, show the mathematical model of a DC motor.

$$v = Ri + L\frac{di}{dt} + K\omega + v_b \tag{1}$$

$$J\frac{d\omega}{dt} = \tau_e - \tau_{LF} \tag{2}$$

Here, v is the voltage applied to the DC motor, i is the motor current, R is the resistance, L is the inductance, K is the back EMF constant, J is the inertia of the motor, $\omega$ is the motor speed, $\tau_e$ is the generated electrical torque, and $\tau_{LF}$ is a load plus friction torque.

Equation (3), below, describes a brush voltage drop $v_b$ due to the brushes 30, 32. $V_0$ is a brush voltage parameter of the motor and $I_0$ is a current parameter of the motor.

The brush voltage drop $v_b$ occurs in the direction of the motor current i, as described in equation (3).

$$v_b = \text{sign}(i) * V_0 \left(1 - e^{-\left|\frac{i}{I_0}\right|}\right) \tag{3}$$

The generated electrical torque $\tau_e$ is directly related to the motor current as set forth in equation (4).

$$\tau_e = Ki \tag{4}$$

Equation (5), below, provides a general approach to calculating a torque command from actual and reference speeds, using a PI control loop. The load-friction torque profiles based on the motor position can be added as the feedforward term in equation (5).

$$\tau_{cmd} = K_p(\omega_{ref} - \omega_m) + K_i \int (\omega_{ref} - \omega) dt \tag{5}$$

where $K_p$ represents a proportional gain value, and $K_i$ represents an integral gain value. Either or both of the proportional gain value $K_p$ and/or the integral gain value $K_i$ may be constants.

The present disclosure provides for three different operating constraints for the DC motor 26, 28, and which may be used for an anti-windup function of the PI control loop described in equation (5). Those operating constraints include:

the motor current limit value $I_{MAX}$;
the supply current limit $I_{slim}$; and
the maximum available voltage $V_{MAX}$ The torque command may be limited in order to satisfy each of these operating constraints. The following sections provide a derivation for maximum and minimum torques based on these constraints are derived in the following sections. Table I, below, lists the motor parameters used for validation of the method and system of the present disclosure. Voltage mode operation may be used with a speed-to-torque controller pole set at −20.

TABLE I

| Parameters values | | |
|---|---|---|
| Parameter | Symbol | Value |
| Resistance | R | 0.833602905 Ω |
| Inductance | L | 0.8 mH |
| BEMF constant | K | 0.030281067 V · s/rad |
| Brush voltage parameter | $V_0$ | 4.1472 V |
| Brush current parameter | $I_0$ | 12 A |
| Inertia | J | 1.0581 × 10⁻⁵ kg/m² |
| Viscous constant | B | 0.000545 Nms/rad |

Figure 5:
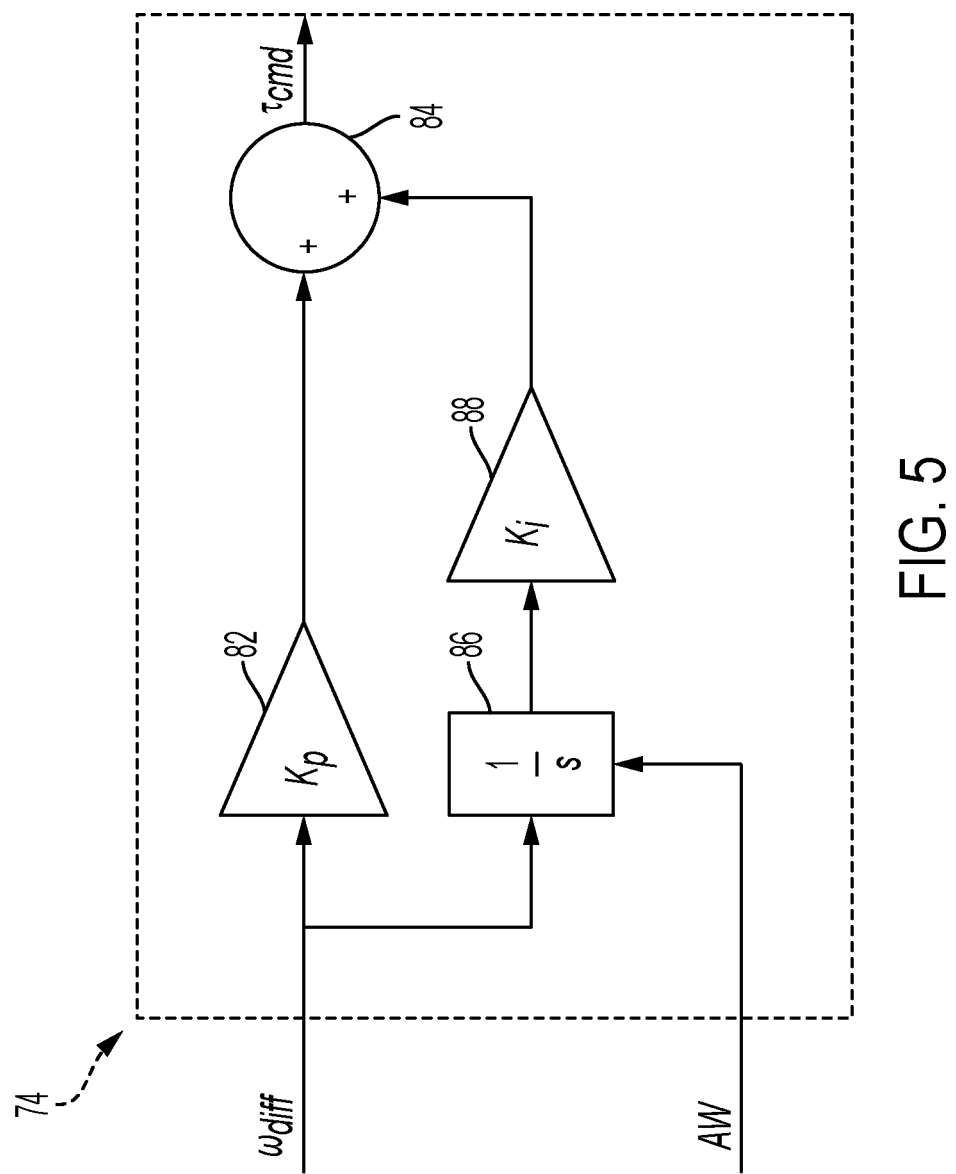
FIG. 5 shows a schematic diagram of a torque command generator of the motor controller, according to aspects of the present disclosure.

FIG. 5 shows a schematic diagram of a torque command generator 74 of the motor controller 70. The torque command generator 74 may implement the PI control loop as set forth in equation (5). The torque command generator 74 includes a first gain block 82 configured to multiply the speed difference signal $\omega_{diff}$ by the proportional gain value $K_p$. The torque command generator 74 also includes an adder 84 configured to compute the torque command signal $\tau_{cmd}$ based on an output of the first gain block 82.

The torque command generator 74 also includes an integrator 86 configured to compute an integral of the speed difference signal $\omega_{diff}$. The torque command generator 74 also includes a second gain block 88 configured to multiply the integral of the speed difference signal $\omega_{diff}$ by the integral gain value $K_i$. The output of the second gain block 88 is provided to the adder 84, which computes the torque command signal $\tau_{cmd}$ based on a sum of the output of the first gain block 82 and the output of the second gain block 88.

In some embodiments, and as shown in FIG. 5, the anti-windup signal AW is provided to the integrator 86. The integrator 86 may pause operation in response to receiving the anti-windup signal AW, indicating that the limited torque command is set based on a torque limit and to satisfy at least one of the operating constraints $I_{MAX}$, $I_{slim}$, $V_{MAX}$.

Motor Current Limit, $I_{MAX}$

A motor current-based maximum torque $\tau_{MAX\_im}$, and a motor current-based minimum torque $\tau_{MIN\_im}$, each based on the motor current i not exceeding the maximum motor current value $I_{MAX}$, may be calculated from the motor current limit $I_{MAX}$, and as set forth in equations (6) and (7):

$$\tau_{MAX\_im} = KI_{MAX} \qquad (6)$$

$$\tau_{MIN\_im} = -KI_{MAX} \qquad (7)$$

Figure 6A:
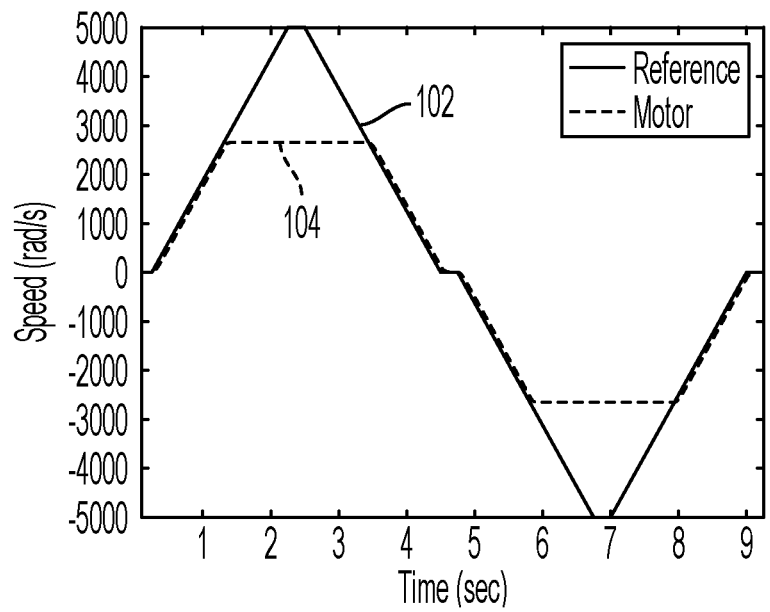
FIGS. 6A-6C show graphs illustrating speed, torque, and motor current, respectively, over a common time scale, and for a DC motor operated according to satisfy a motor current limit, according, aspects of the present disclosure.
Figure 6B:
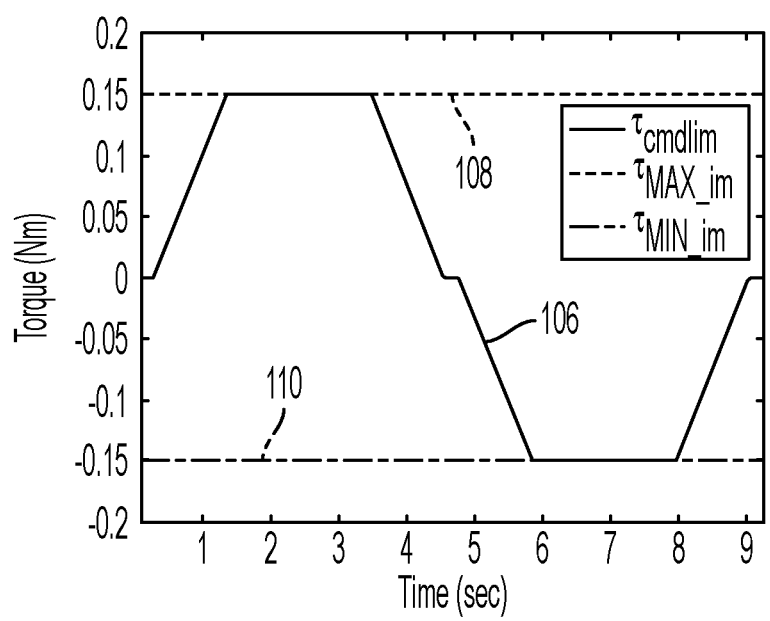
Figure 6C:
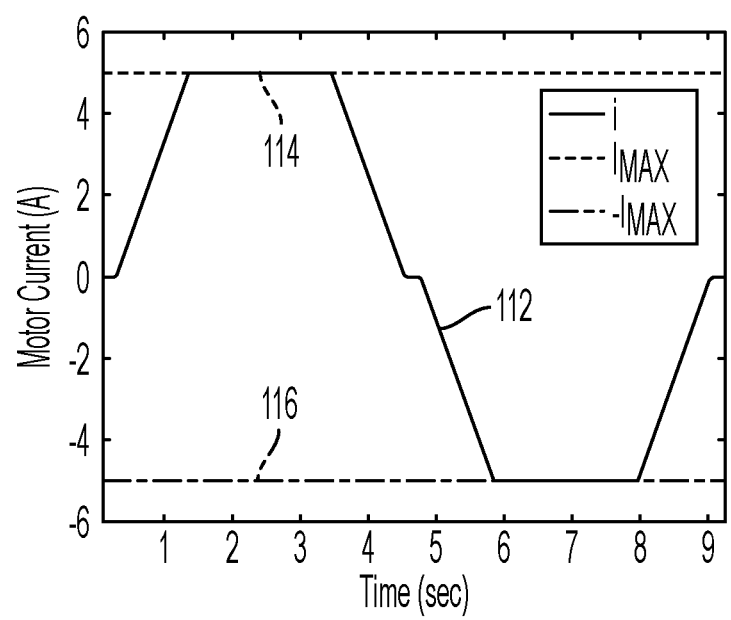

FIGS. 6A-6C show graphs illustrating speed, torque, and motor current, respectively, over a common time scale, and for the DC motor 26, 28 operated according to satisfy a motor current limit $I_{MAX}$ of 5.0 Amps. FIG. 6A includes a first plot 102 showing the speed command signal $\omega_{ref}$, also called reference speed, and a second plot 104 showing the motor speed $\omega_m$, also called the actual motor speed.

The limited torque command $\tau_{cmdlim}$ is being limited based on the motor current-based maximum torque $\tau_{MAX\_im}$, and a motor current-based minimum torque $\tau_{MIN\_im}$ from equations (6) and (7), respectively, to cause the DC motor 26, 28 to satisfy the motor current limit $I_{MAX}$ of 5.0 Amps in regions over 2650 rpm and under the −2650 rpm reference speed. These regions where the limited torque command $\tau_{cmdlim}$ is being limited to cause the system 50 to satisfy one or more of the operating constraints may be called an anti-windup region.

FIG. 6B includes a third plot 106 of the limited torque command τcmdlim with a first line 108 showing the motor current-based maximum torque $\tau_{MAX\_im}$ corresponding to the DC motor 26, 28 satisfying a positive motor current limit $I_{MAX}$ of +5.0 Amps, while operating in a positive speed direction. FIG. 6B also includes a second line 110 showing the motor current-based minimum torque $\tau_{MIN\_im}$ corresponding to the DC motor 26, 28 satisfying a negative motor current limit $-I_{MAX}$ of −5.0 Amps, while operating in a negative speed direction. This limiting method may be verified if the actual motor current i reaches ±5 A when the anti-windup starts and stays at that limit for the full anti-windup region.

FIG. 6C includes a fourth plot 112 of motor current i, a first line 114 showing the motor current limit $I_{MAX}$, for positive polarity (i.e. forward direction operation), and a second line 116 showing a negative motor current limit $-I_{MAX}$, for negative polarity (i.e. reverse direction operation). FIG. 6C shows the exact activity of motor current i and verifies the proper limiting of the maximum motor currents $I_{MAX}$, $-I_{MAX}$.

Supply Current Limit, $I_{slim}$

At the ECU voltage, $V_{ECU}$, the supply current limit, $I_{slim}$ ultimately limits the power delivered or absorbed by the battery. The motor power formula can be written as set forth in equation (8):

$$P_{Mtr} = Ri^2 + K\omega i + \text{sign}(i) * V_0 \left(1 - e^{-\frac{|i|}{I_0}}\right) i \qquad (8)$$

At the limiting condition, the relationship may be described by equation (9):

$$RI_{MS}^2 + K\omega I_{MS} + \text{sign}(I_{MS}) * V_0 \left(1 - e^{-\frac{|I_{MS}|}{I_0}}\right) I_{MS} = V_{ECU} I_{slim} - R_c I_{slim}^2 \qquad (9)$$

Here, $R_c$ is the controller resistance, $I_{MS}$ is the maximum motor current for the supply current limit $I_{slim}$.

Alternative controllers may either ignore or simplify the brush voltage drop $v_b$ terms to solve for $I_{MS}$. One such alternative design assumes brush voltage drop $v_b$ to be equal to the brush voltage parameter $V_0$ and having a constant value, ignoring the exponential term. Several issues can emerge with this simplification. For small motors, both terms can come out as unusually larger than expected numbers. On the other hand, if the value of the supply current lessens due to some adverse condition, the maximum motor current, $I_{MS}$ can not be considered too high compared to brush current, $I_0$. Thus, considering the brush voltage drop $v_b$ in that condition may result in a lower $I_{MS}$. This may be especially problematic in adverse conditions when it is desirable to get the most torque possible, while satisfying the operating constraints. To properly solve this equation, the most traditional approach would be an iteration method. However, the iteration method may require a large computational burden and cost.

The actual motor current i may be used to calculate the brush voltage drop $v_b$, and that brush voltage drop $v_b$ may be used to solve for a maximum motor current corresponding to the supply current limit $I_{MS}$. Thus, the first step is to use equation (3) to find the brush voltage drop $v_b$ for a certain condition. Equation (9), considering the brush voltage drop $v_b$, may be rewritten as equation (10):

$$RI_{MS}^2 + K\omega I_{MS} + v_b I_{MS} = V_{ECU} I_{slim} - R_c I_{slim}^2 \qquad (10)$$

Two solutions of equation (10) can be assigned as the maximum and minimum motor current for supply current limit as set forth in equations (11)-(12), below:

$$I_{MS,MAX} = \frac{1}{2R}\left(-(K\omega + v_b) + \sqrt{(K\omega + v_b)^2 + 4R(V_{ECU} I_{slim} - R_c I_{slim}^2)}\right) \qquad (11)$$

$$I_{MS,MIN} = \frac{1}{2R}\left(-(K\omega + v_b) - \sqrt{(K\omega + v_b)^2 + 4R(V_{ECU} I_{slim} - R_c I_{slim}^2)}\right) \qquad (12)$$

This approach may have some shortcomings. If the brush voltage drop $v_b$ is less significant during the limiting conditions, then the proposed method provides a solution very close to the actual solution of equation (9) in all conditions. The solution of the proposed method only deviates from the actual solution when the brush voltage drop $v_b$ is very significant and the actual current is far away from $I_{MS}$. However, even with significant brush voltage drop $v_b$, as the motor current gets close to the maximum value, $I_{MS}$, the proposed solution closely approximates an actual solution, ensuring proper limiting when required.

A supply current-based maximum torque $\tau_{MAX\_is}$, and a supply current-based minimum torque $\tau_{MIN\_is}$, each based on the supply current value $I_s$ not exceeding the supply current limit $I_{slim}$, may be calculated from the supply current limit $I_{slim}$, and as set forth in equations (13) and (14):

$$\tau_{MAX\_is} = \frac{K}{2R}\left(-(K\omega+v_b) + \sqrt{(K\omega+v_b)^2 + 4R(V_{ECU}I_{slim} - R_c I_{slim}^2)}\right) \quad (13)$$

$$\tau_{MIN\_is} = \frac{K}{2R}\left(-(K\omega+v_b) - \sqrt{(K\omega+v_b)^2 + 4R(V_{ECU}I_{slim} - R_c I_{slim}^2)}\right) \quad (14)$$

Figure 7A:
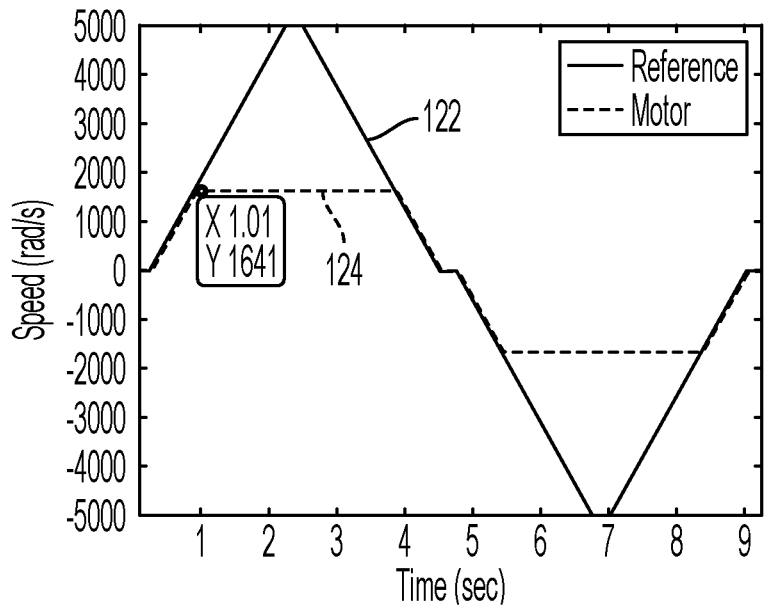
FIGS. 7A-7C show graphs illustrating speed, torque, and motor current, respectively, over a common time scale, and for a DC motor operated to satisfy a supply current limit, according to aspects of the present disclosure.
Figure 7B:
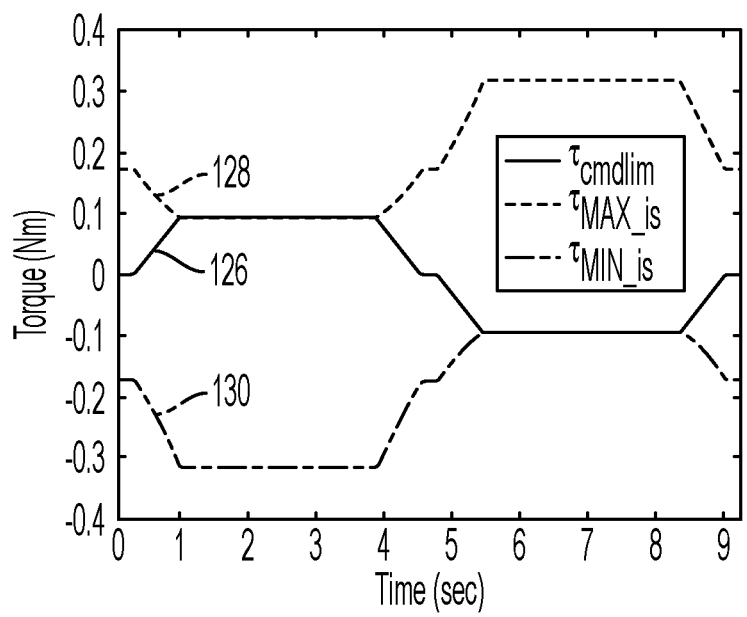
Figure 7C:
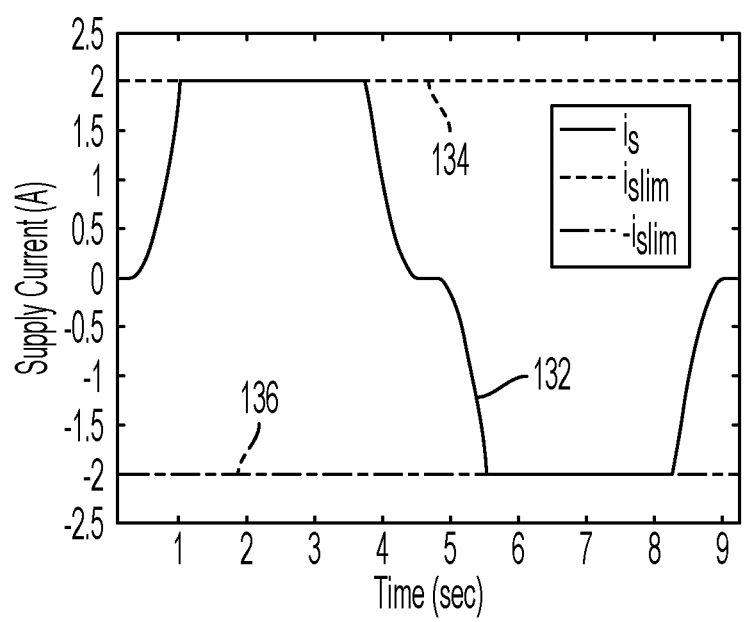

FIGS. 7A-7C show graphs illustrating speed, torque, and motor current, respectively, over a common time scale, and for the DC motor 26, 28 operated to satisfy a supply current limit $I_{slim}$ of 2.0 Amps. FIG. 7A includes a fifth plot 122 showing the speed command signal $\omega_{ref}$, also called reference speed, and a sixth plot 124 showing the motor speed $\omega_m$, also called the actual motor speed.

The limited torque command $\tau_{cmdlim}$ is being limited based on the supply current-based maximum torque $\tau_{MAX\_is}$ and the supply current-based minimum torque $\tau_{MIN\_is}$ from equations (13) and (14), respectively, to cause the controller 60 to satisfy the supply current limit $I_{slim}$ of 2.0 Amps in regions over 1641 rpm and under −1641 rpm.

FIG. 7B includes a seventh plot 126 of the limited torque command $\tau_{cmdlim}$, with a first line 128 showing the supply current-based maximum torque $\tau_{MAX\_is}$ corresponding to the controller 60 satisfying the motor current limit $I_{MAX}$, while operating in a positive speed direction. FIG. 7B also includes a second line 130 showing a minimum torque $\tau_{MIN\_is}$ corresponding to the DC motor 26, 28 satisfying the motor current limit $I_{MAX}$, while operating in a negative speed direction.

FIG. 7C includes an eighth plot 132 of supply current $i_s$, a first line 134 showing the supply current limit $I_{slim}$ of 2.0 Amps for positive polarity (i.e. forward direction operation), and a second line 136 showing a negative supply current limit $-I_{slim}$ of −2.0 Amps for negative polarity (i.e. reverse direction operation). FIG. 7C shows the exact activity of supply current $i_s$ and verifies the proper limiting of the supply current limits $I_{slim}$, $-I_{slim}$.

Maximum Available Voltage, $V_{MAX}$

The maximum available voltage may be described as set forth in equation (15):

$$\left|Ri + L\frac{di}{dt} + K\omega + \text{sign}(i) * v_0\left(1 - e^{-\left|\frac{i}{i_0}\right|}\right)\right| \leq V_{MAX} \quad (15)$$

At the limiting condition, equation (15) can be expressed as equation (16):

$$RI_{MV} + K\omega + \text{sign}(I_{MV}) * v_0\left(1 - e^{-\left|\frac{I_{MV}}{i_0}\right|}\right) = V_{MAX} \quad (16)$$

Here, $I_{MV}$ is the current limit considering the maximum available voltage $V_{MAX}$. The dynamic term can be considered negligible with the current not changing significantly at the limiting condition. One thing to notice here, we used a different variable for maximum available voltage since the full battery or controller supply voltage $V_{ECU}$ may not be available for the controller 60 to apply to the DC motor 26, 28. This equation becomes very difficult to solve without the iteration method. As described, iterative solving requires significant computational costs. Furthermore, the zero value is not used as maximum or minimum limit at any point for more robust operation and simplicity.

The system and method of the present disclosure may calculate the brush voltage drop $v_b$ based on the actual motor current i, thereby eliminating the exponential term, $$e^{-\left|\frac{I_{MV}}{i_0}\right|}.$$

Thus, the method of the present disclosure may first calculate the brush voltage drop $v_b$ in real-time using equation (3) and then, solve for current limits considering the maximum available voltage $I_{MV}$. Equations (17) and (18) illustrate the solutions for positive and negative current limits.

$$I_{MV,MAX} = \frac{V_{MAX} - K\omega - v_b}{R} \quad (2)$$

$$I_{MV,MIN} = \frac{-V_{MAX} - K\omega - v_b}{R} \quad (3)$$

A supply voltage-based maximum torque $\tau_{MAX\_vs}$, and a supply voltage-based minimum torque $\tau_{MIN\_vs}$, each based on a required controller supply voltage $V_{ECU}$ not exceeding the maximum available voltage $V_{MAX}$, may be calculated from the maximum available voltage $V_{MAX}$, and as set forth in equations (19) and (20):

$$\tau_{MAX\_vs} = \frac{K}{R}(V_{MAX} - K\omega - v_b) \quad (19)$$

$$\tau_{MIN\_vs} = \frac{K}{R}(-V_{MAX} - K\omega - v_b) \quad (20)$$

This approach provides an accurate solution when the motor current i is close to $I_{MV}$. The solution can deviate slightly when the motor current i is far away from the limit, where torque limiting based on the available voltage is not necessary.

Figure 8A:
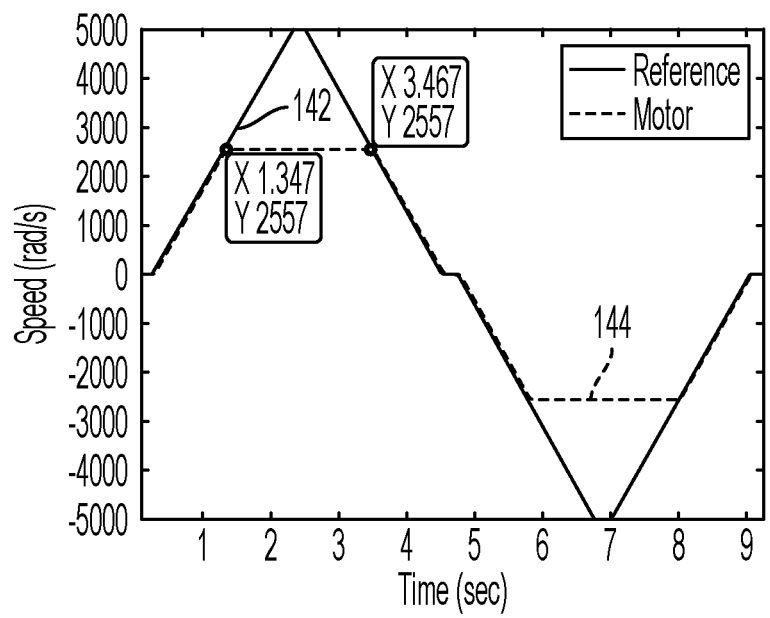
FIGS. 8A-8C show graphs illustrating speed, torque, and motor current, respectively, over a common time scale, and for a DC motor operated to satisfy a supply voltage limit, according to aspects of the present disclosure.
Figure 8B:
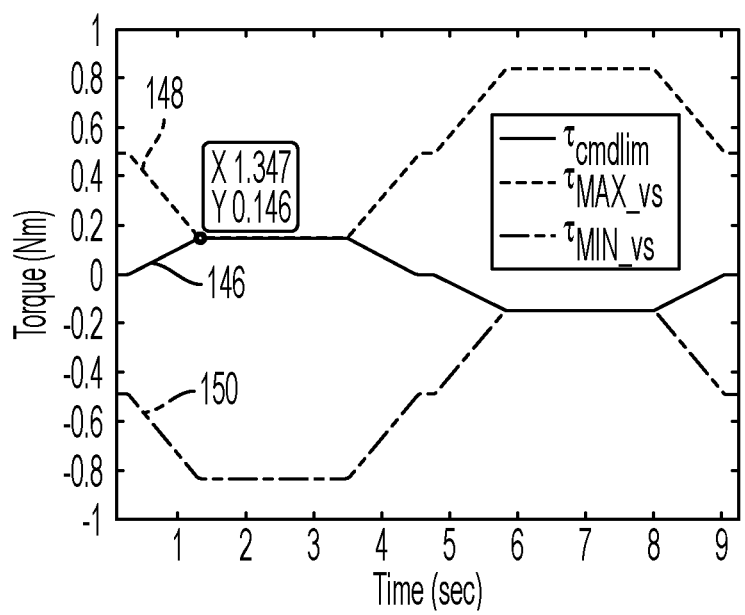
Figure 8C:
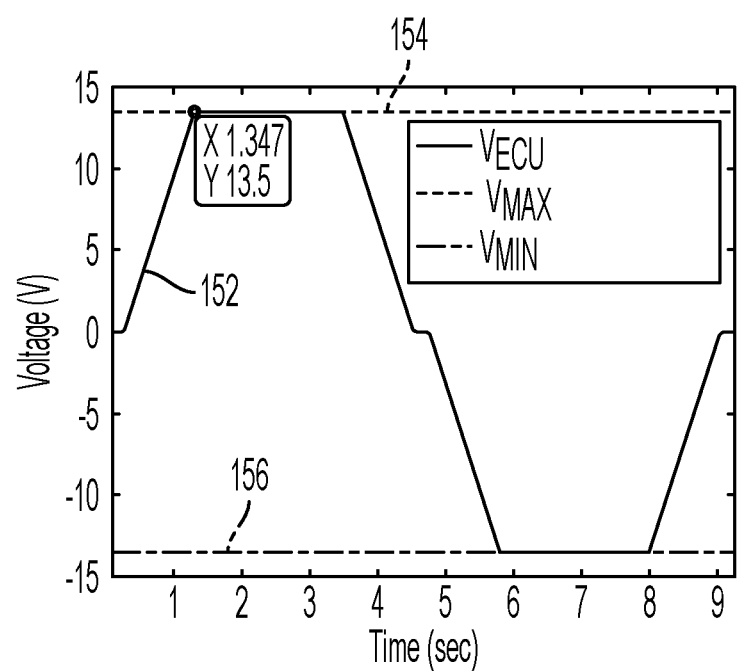

FIGS. 8A-8C show graphs illustrating speed, torque, and motor current, respectively, over a common time scale, and for the DC motor 26, 28 operated to satisfy the maximum available voltage $V_{MAX}$, also called the supply voltage limit, of 13.5 V. FIG. 8A includes a ninth plot 142 showing the speed command signal $\omega_{ref}$, also called reference speed, and a tenth plot 144 showing the motor speed $\omega_m$, also called the actual motor speed.

The limited torque command $\tau_{cmdlim}$ is being limited based on the supply voltage-based maximum torque $\tau_{MAX\_vs}$ and the supply voltage-based minimum torque $\tau_{MIN\_vs}$, from equations (19) and (20), respectively, to cause the controller 60 to satisfy the supply voltage limit of 13.5 V in regions over 2557 rpm and under −2557 rpm.

FIG. 8B includes a eleventh plot 146 of the limited torque command $\tau_{cmdlim}$, with a first line 148 showing the supply voltage-based maximum torque $\tau_{MAX\_vs}$ corresponding to the controller 60 satisfying the supply voltage limit of 13.5 V while operating in a positive speed direction. FIG. 8B also includes a second line 150 showing a minimum torque $\tau_{MIN\_vs}$ corresponding to the controller 60 satisfying the supply voltage limit of 13.5 V while operating in a negative speed direction.

FIG. 8C includes a twelfth plot 152 of the controller supply voltage $V_{ECU}$, a first line 154 showing the maximum available voltage $V_{MAX}$ of 13.5 V for positive polarity (i.e.

forward direction operation), and a second line 156 showing a negative maximum available voltage $-V_{MAX}$, also called $V_{MIN}$ of $-13.5$ V for negative polarity (i.e. reverse direction operation). FIG. 8C shows that the torque limiting keeps the reference voltage within $\pm 13.5$ V, proving the effectiveness of the proposed method.

All three sets of maximum and minimum torque limits from the three constraints of the system are combined to find a final maximum torque $\tau_{MAX\_final}$ and a final minimum torque $\tau_{MIN\_final}$ for the controller using the following equations (21)-(22):

$$\tau_{MAX\_final} = \min(\tau_{MAX\_im}, \tau_{MAX\_is}, \tau_{MAX\_vs}) \quad (21)$$

$$\tau_{MIN\_final} = \max(\tau_{MIN\_im}, \tau_{MIN\_is}, \tau_{MIN\_vs}) \quad (22)$$

This limiting of the torque command $\tau_{cmd}$, as performed by the torque limiter 76 to determine the limited torque command $\tau_{cmdlim}$ is described in equation (23)-(24), below:

$$\tau_{cmd} \geq \tau_{MAX\_final}; \tau_{cmdlim} = \tau_{MAX\_final}; \text{integrator}(\omega_{ref} - \omega) = 0 \quad (23)$$

$$\tau_{cmd} \leq \tau_{MAX\_final}; \tau_{cmdlim} = \tau_{MIN\_final}; \text{integrator}(\omega_{ref} - \omega) = 0 \quad (24)$$

Anti-Windup

As soon as the torque command torque command signal $\tau_{cmd}$ exceeds these limits (i.e. if the torque command signal $\tau_{cmd}$ is greater than the final maximum torque $\tau_{MAX\_final}$ or less than the final minimum torque $\tau_{MIN\_final}$), the torque limiter 76 may generate anti-windup signal AW, indicating that the limited torque command $\tau_{cmdlim}$ is being limited. In response to the anti-windup signal AW, the integrator 86 may pause operation. For example, the anti-windup signal AW may cause the integrator 86 to output a zero signal. Accordingly, and in response to the anti-windup signal AW, the integrator 86 will stop at a previous value it obtained, and as soon as the system 50 moves out of the anti-windup region, the integrator 88 will resume operation.

In some embodiments, the current command $i_{cmd}$ may be used in place of the actual motor current i for calculating the brush voltage drop $v_b$. For example, the current command $i_{cmd}$ may be used if the motor current measurement $i_m$ becomes unavailable.

Figure 9:
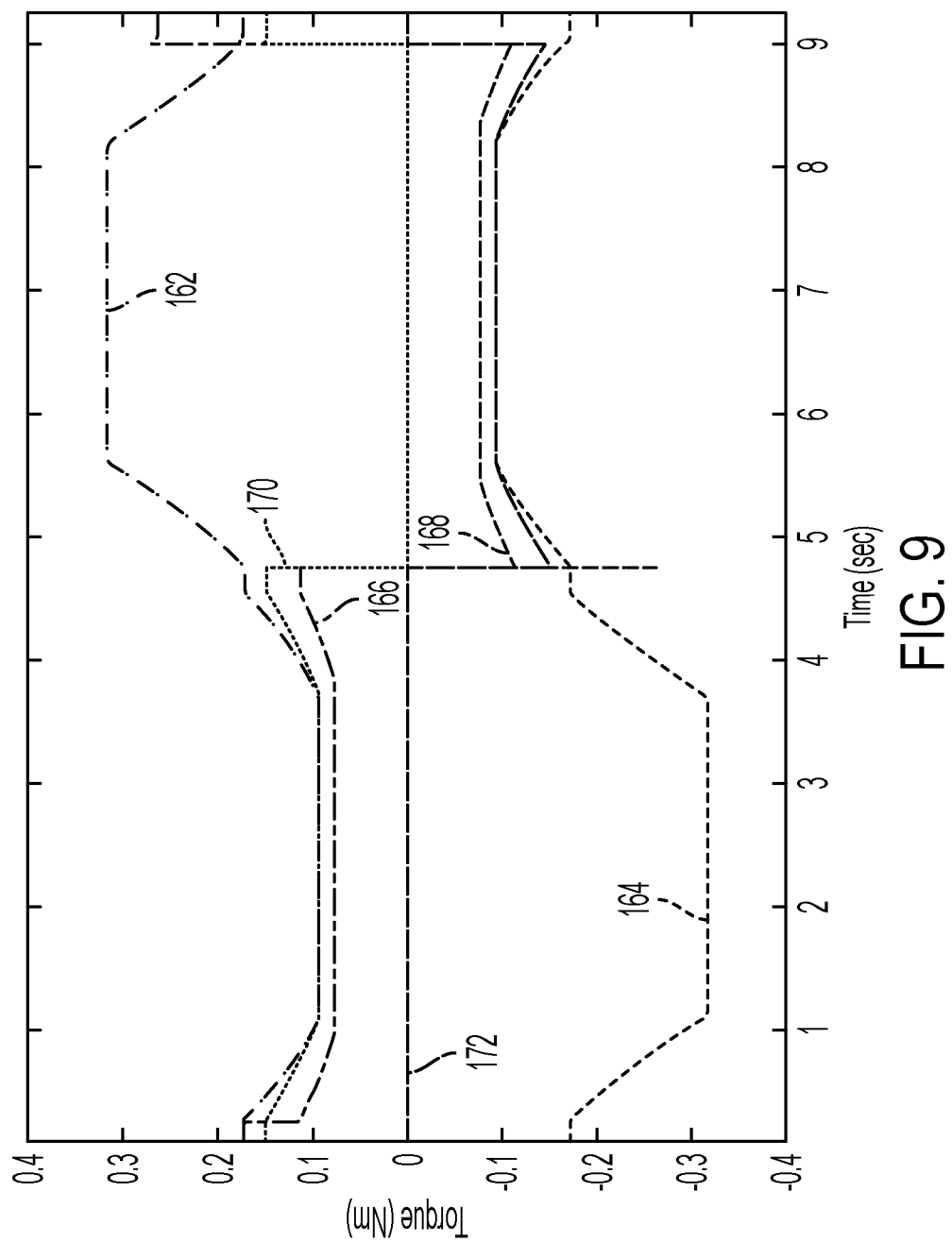
FIG. 9 shows a graph illustrating torque produced by a DC motor, over a period of time, and using a method of the present disclosure and two alternative techniques for operating the DC motor, each including estimating a brush voltage drop.

FIG. 9 shows a graph illustrating torque produced by the DC motor 26, 28, over a period of time, and using a method of the present disclosure and two alternative techniques for operating the DC motor 26, 28, each including estimating a brush voltage drop $v_b$.

FIG. 9 includes a first plot 162 showing a maximum torque limit $\tau_{max}$ and a second plot 164 showing a minimum torque limit $\tau_{min}$, each computed using the techniques of the present disclosure to cause supply current value is not to exceed the supply current limits $I_{slim}$, $-I_{slim}$. FIG. 9 also includes a third plot 166 and a fourth plot 168 showing maximum and minimum torque limits, respectively, computed to cause supply current value is not to exceed the supply current limits $I_{slim}$, $-I_{slim}$ and using an alternative technique using a simplified assumption that the brush voltage drop $v_b$ is constant. FIG. 9 also includes a fifth plot 170 and a sixth plot 172 showing maximum and minimum torque limits, respectively, computed to cause supply current value is not to exceed the supply current limits $I_{slim}$, $-I_{slim}$ and using an alternative technique using an iterative solver.

The graph of FIG. 9 shows positive torque limits (i.e. forward operation) during times 0-4.8 seconds, and negative torque limits (i.e. reverse operation) between about 4.8 seconds and 9.0 seconds. As shown, the first plot 162 showing the maximum torque limit $\tau_{max}$ is approximately equal to the corresponding fifth plot 170 when the maximum torque limit $\tau_{max}$ is relevant, during forward operation from times 0-4.8 seconds. Similarly, the second plot 164 showing the minimum torque limit $\tau_{min1}$ is approximately equal to the corresponding sixth plot 172 when the minimum torque limit $\tau_{min}$ is relevant, during reverse operation (between 4.8 and 9.0 seconds). This demonstrates the effectiveness of the techniques of the present disclosure, which are much more accurate for producing torque limits to satisfy the operating conditions when compared to the simplified approach shown in the third and fourth plots, 166, 168, while also using substantially less computational resources than is required for the iterative technique shown in the fifth and sixth plots 170, 172.

Additionally, the iterative solver technique uses zero for the minimum torque limit, as shown by the sixth plot 172, during forward operation (between 0-4.8 seconds). The iterative solver technique also uses zero for the maximum torque limit, as shown by the fifth plot 170 during reverse operation (between 4.8 and 9.0 seconds). The system and method of the present disclosure, on the other hand, does not use zero for a maximum or minimum limit any time. Thus, it avoids any potential confusion of whether the maximum or minimum torque limit should be zero at the standstill position. This difference also enables the system and method of the present disclosure to avoid delays in deciding whether to use a zero value, making it a more robust approach.

Figure 10:
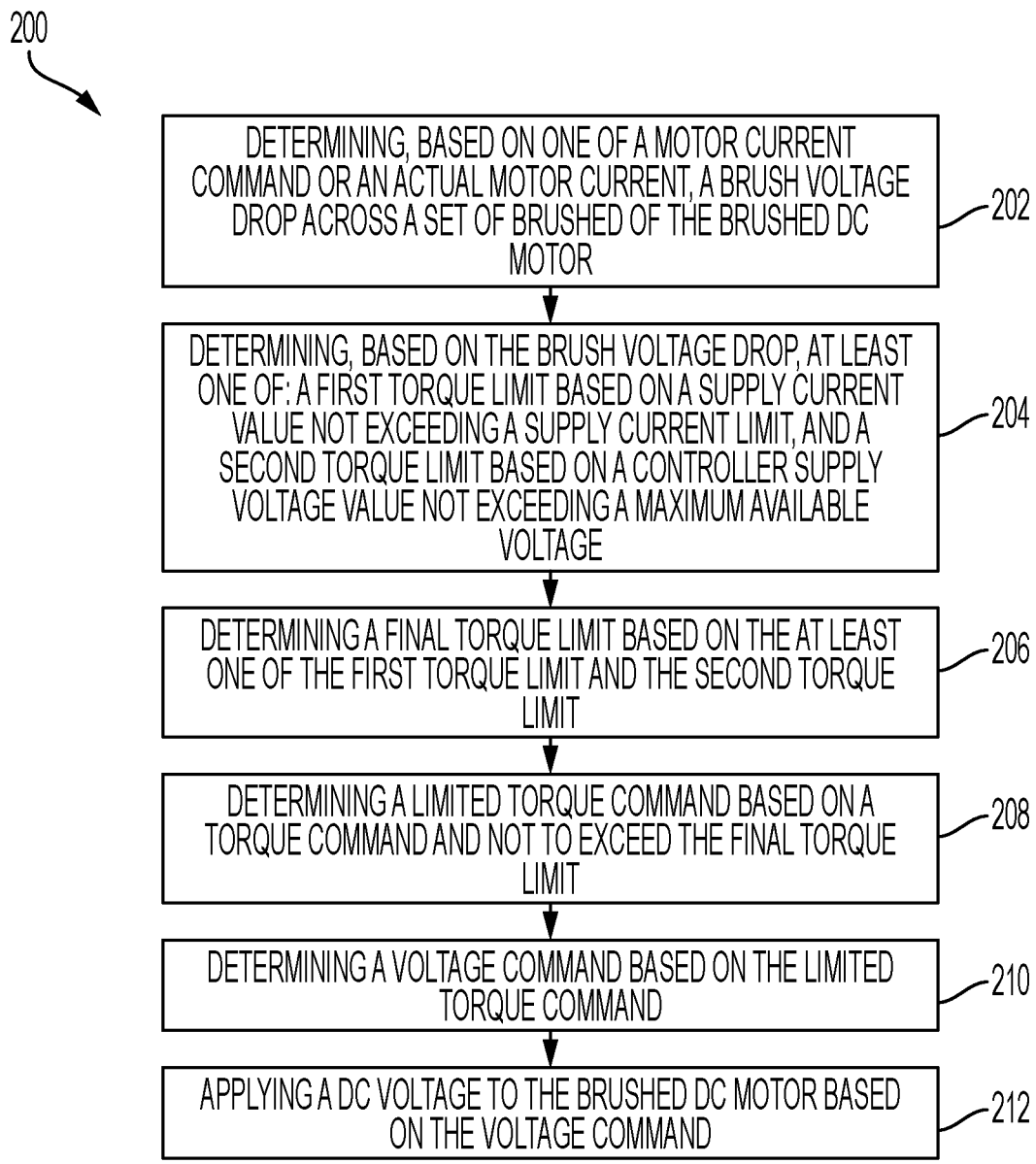
FIG. 10 shows a flow diagram listing steps in a method for operating a DC motor, according to aspects of the present disclosure.

FIG. 10 shows a flow diagram listing steps in a method 200 for operating a DC motor, according to aspects of the present disclosure. The method 200 can be performed by the motor controller 70 of the present disclosure. As can be appreciated in light of the disclosure, the order of operation within the method is not limited to the sequential execution as illustrated in FIG. 10, but may be performed in one or more varying orders as applicable and in accordance with the present disclosure.

At 202, the method 200 determines, based on one of a motor current command or an actual motor current, a brush voltage drop across a set of brushes of the brushed DC motor. For example, the processor 62 may execute instructions to compute the brush voltage drop $v_b$ using equation (3), and based on either the motor current command $i_{cmd}$ or the motor current signal $i_m$ representing a measured value of the actual motor current i.

At 204, the method 200 determines, based on the brush voltage drop, at least one of: a first torque limit based on a supply current value not exceeding a supply current limit, and a second torque limit based on a controller supply voltage value not exceeding a maximum available voltage. For example, the processor 62 may execute instructions to compute the supply current-based maximum torque $\tau_{MAX\_is}$, the supply current-based minimum torque $\tau_{MIN\_is}$, the supply voltage-based maximum torque $\tau_{MAX\_vs}$, and/or the supply voltage-based minimum torque $\tau_{MIN\_vs}$, and using corresponding ones of equations (13), (14), (19) and/or (20).

At 206, the method 200 determines a final torque limit based on the at least one of the first torque limit and the second torque limit. For example, the processor 62 may execute instructions to compute the final maximum torque $\tau_{MAX\_final}$ and/or the final minimum torque $\tau_{MIN\_final}$, as set forth in equations (21)-(22).

At 208, the method 200 determines a limited torque command based on a torque command and not to exceed the final torque limit. For example, the processor 62 may execute instructions to implement the torque limiter 76 configured to generate a limited torque command τcmdlim based on the torque command signal $\tau_{cmd}$, and not exceeding the final maximum torque $\tau_{MAX\_final}$ and/or the final minimum torque $\tau_{MIN\_final}$.

At 210, the method 200 determines a voltage command based on the limited torque command. For example, the processor 62 may execute instructions to implement the torque regulator 78 and the current regulator 80, with the torque regulator 78 generating a current command $i_{cmd}$ based on the limited torque command $\tau_{cmdlim}$, and with the current regulator 80 generating the voltage command $v_{cmd}$ based on the current command $i_{cmd}$.

At 212, the method 200 applies a DC voltage to the brushed DC motor based on the voltage command. For example, the voltage regulator 52 may generate and apply the DC voltage v to the first brush 30 of the DC motor 26, 28, with the DC voltage v based on the voltage command $v_{cmd}$ from the controller 60.

The present disclosure provides a method of controlling a brushed direct current (DC) motor. The method includes: determining, based on one of a motor current command or an actual motor current, a brush voltage drop across a set of brushes of the brushed DC motor; determining, based on the brush voltage drop, at least one of: a first torque limit based on a supply current value not exceeding a supply current limit, and a second torque limit based on a controller supply voltage value not exceeding a maximum available voltage; determining a final torque limit based on the at least one of the first torque limit and the second torque limit; determining a limited torque command based on a torque command and not to exceed the final torque limit; determining a voltage command based on the limited torque command; and applying a DC voltage to the brushed DC motor based on the voltage command.

In some embodiments, determining the brush voltage drop includes computing the brush voltage drop in accordance with a non-linear equation:

$$v_b = \text{sign}(i) * V_0 \left(1 - e^{-\left|\frac{i}{I_0}\right|}\right),$$

where $v_b$ is the brush voltage drop, i is the one of the motor current command or the actual motor current, and $V_0$ is a brush voltage parameter, and $I_0$ is a brush current parameter.

In some embodiments, the final torque limit is based on the first torque limit.

In some embodiments, determining the final torque limit includes calculating the first torque limit based on at least one of: a maximum torque limit ($\tau_{MAX}$) in accordance with:

$$\tau_{MAX} = \frac{K}{2R}\left(-(K\omega + v_b) + \sqrt{(K\omega + v_b)^2 + 4R(V_{ECU}I_{slim} - R_c I_{slim}^2)}\right),$$

or a minimum torque limit ($\tau_{MIN}$) in accordance with:

$$\tau_{MIN} = \frac{K}{2R}\left(-(K\omega + v_b) - \sqrt{(K\omega + v_b)^2 + 4R(V_{ECU}I_{slim} - R_c I_{slim}^2)}\right),$$

where K is a back-EMF constant of the brushed DC motor, R is a winding resistance of the brushed DC motor, ω is a speed of the brushed DC motor, $v_b$ is a brush voltage drop across a set of brushes of the brushed DC motor, $V_{ECU}$ is a controller supply voltage, $I_{slim}$ is the supply current limit, and $R_c$ is a controller resistance.

In some embodiments, the final torque limit is based on the second torque limit.

In some embodiments, determining the final torque limit includes calculating the second torque limit based on at least one of: a maximum torque limit ($\tau_{MAX}$) in accordance with:

$$\tau_{MAX} = \frac{K}{R}(V_{MAX} - K\omega - v_b),$$

or a minimum torque limit ($\tau_{MIN}$) in accordance with:

$$\tau_{MIN} = \frac{K}{R}(-V_{MAX} - K\omega - v_b),$$

where K is a back-EMF constant of the brushed DC motor, R is a winding resistance of the brushed DC motor, $V_{MAX}$ is the maximum available voltage value, ω is a speed of the brushed DC motor, and $v_b$ is a brush voltage drop across a set of brushes of the brushed DC motor.

In some embodiments, the method further includes determining a third torque limit based on a motor current not exceeding a maximum motor current value, and determining the final torque limit is further based on the third torque limit.

In some embodiments, the method further includes integrating a value for determining the torque command; and pausing integrating the value in response to setting the limited torque command based on the final torque limit.

In some embodiments, determining the torque limit includes: determining a first maximum torque limit based on the supply current value not exceeding the supply current limit; determining a second maximum torque limit based on the controller supply voltage value not exceeding the maximum available voltage; determining a final maximum torque limit based on a lowest one of a plurality of maximum torque limits including, at least, the first maximum torque limit and the second maximum torque limit; determining a first minimum torque limit based on the supply current value not exceeding the supply current limit; determining a second minimum torque limit based on the controller supply voltage value not exceeding the maximum available voltage value; and determining a final minimum torque limit based on a highest one of a plurality of minimum torque limits including, at least, the first minimum torque limit and the second minimum torque limit. The final torque limit may include each of the final maximum torque limit and the final minimum torque limit.

In some embodiments, the brushed DC motor is an actuator motor configured to control a position of a handwheel of a steering system in a vehicle.

The present disclosure provides a motor control system. The motor system includes: a brushed direct current (DC) motor having a set of brushes; a voltage regulator configured to apply a DC voltage to the brushed DC motor based on a voltage command; and a controller configured to: determine, based on one of a motor current command or an actual motor current, a brush voltage drop across the set of brushes of the brushed DC motor; determine, based on the brush voltage drop, at least one of: a first torque limit based on a supply current value not exceeding a supply current limit, and a second torque limit based on a controller supply voltage value not exceeding a maximum available voltage; determine a final torque limit based on the at least one of the first torque limit and the second torque limit; determine a limited torque command based on a torque command and not to exceed the final torque limit; determine a voltage command based on the limited torque command; and transmit the voltage command to the voltage regulator.

In some embodiments, determining the brush voltage drop includes computing the brush voltage drop in accordance with:

$$v_b = \text{sign}(i) * V_0 \left(1 - e^{-\left|\frac{i}{I_0}\right|}\right),$$

where $v_b$ is the brush voltage drop, i is the one of the motor current command or the actual motor current, and $V_0$ is a brush voltage parameter, and $I_0$ is a brush current parameter.

In some embodiments, the final torque limit is based on the first torque limit.

In some embodiments, determining the final torque limit includes calculating the first torque limit based on at least one of: a maximum torque limit ($\tau_{MAX}$) in accordance with:

$$\tau_{MAX} = \frac{K}{2R}\left(-(K\omega + v_b) + \sqrt{(K\omega + v_b)^2 + 4R(V_{ECU}I_{slim} - R_c I_{slim}^2)}\right),$$

or a minimum torque limit ($\tau_{MIN}$) n accordance with:

$$\tau_{MIN} = \frac{K}{2R}\left(-(K\omega + v_b) - \sqrt{(K\omega + v_b)^2 + 4R(V_{ECU}I_{slim} - R_c I_{slim}^2)}\right),$$

where K is a back-EMF constant of the brushed DC motor, R is a winding resistance of the brushed DC motor, ω is a speed of the brushed DC motor, $v_b$ is a brush voltage drop across a set of brushes of the brushed DC motor, $V_{ECU}$ is a controller supply voltage, $I_{slim}$ is the supply current limit, and R, is a controller resistance.

In some embodiments, the final torque limit is based on the second torque limit.

In some embodiments, determining the final torque limit includes calculating the second torque limit based on at least one of: a maximum torque limit ($\tau_{MAX}$) in accordance with:

$$\tau_{MAX} = \frac{K}{R}(V_{MAX} - K\omega - v_b),$$

or a minimum torque limit ($\tau_{MIN}$) in accordance with:

$$\tau_{MIN} = \frac{K}{R}(-V_{MAX} - K\omega - v_b),$$

where K is a back-EMF constant of the brushed DC motor, R is a winding resistance of the brushed DC motor, $V_{MAX}$ is the maximum available voltage value, ω is a speed of the brushed DC motor, and $v_b$ is a brush voltage drop across a set of brushes of the brushed DC motor.

In some embodiments, the controller is further configured to determine a third torque limit based on a motor current not exceeding a maximum motor current value, and determining the final torque limit is further based on the third torque limit.

In some embodiments, the controller is further configured to: integrate a value for determining the torque command; and pause integrating the value in response to setting the limited torque command based on the final torque limit.

In some embodiments, determining the torque limit includes: determining a first maximum torque limit based on the supply current value not exceeding the supply current limit; determining a second maximum torque limit based on the controller supply voltage value not exceeding the maximum available voltage; determining a final maximum torque limit based on a lowest one of a plurality of maximum torque limits including, at least, the first maximum torque limit and the second maximum torque limit; determining a first minimum torque limit based on the supply current value not exceeding the supply current limit; determining a second minimum torque limit based on the controller supply voltage value not exceeding the maximum available voltage value; and determining a final minimum torque limit based on a highest one of a plurality of minimum torque limits including, at least, the first minimum torque limit and the second minimum torque limit. The final torque limit may include each of the final maximum torque limit and the final minimum torque limit.

In some embodiments, the brushed DC motor is an actuator motor configured to control a position of a handwheel of a steering system in a vehicle.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A method of controlling a brushed direct current (DC) motor, comprising:
   determining, based on one of a motor current command or an actual motor current, a brush voltage drop across a set of brushes of the brushed DC motor;
   determining, based on the brush voltage drop, at least one of: a first torque limit based on a supply current value not exceeding a supply current limit, and a second torque limit based on a controller supply voltage value not exceeding a maximum available voltage;
   determining a final torque limit based on the at least one of the first torque limit and the second torque limit;
   determining a limited torque command based on a torque command and not to exceed the final torque limit;
   determining a voltage command based on the limited torque command; and
   applying a DC voltage to the brushed DC motor based on the voltage command.

2. The method of claim 1, wherein determining the brush voltage drop includes computing the brush voltage drop in accordance with a non-linear equation:

$$v_b = \text{sign}(i) * V_0\left(1 - e^{-\left|\frac{i}{I_0}\right|}\right),$$

where $v_b$ is the brush voltage drop, i is the one of the motor current command or the actual motor current, and $V_0$ is a brush voltage parameter, and $I_0$ is a brush current parameter.

3. The method of claim 1, wherein the final torque limit is based on the first torque limit.

4. The method of claim 3, wherein determining the final torque limit includes calculating the first torque limit based on at least one of: a maximum torque limit ($\tau_{MAX}$) in accordance with:

$$\tau_{MAX} = \frac{K}{2R}\left(-(K\omega + v_b) + \sqrt{(K\omega + v_b)^2 + 4R(V_{ECU}I_{slim} - R_c I_{slim}^2)}\right),$$

or a minimum torque limit ($\tau_{MIN}$) in accordance with:

$$\tau_{MIN} = \frac{K}{2R}\left(-(K\omega + v_b) - \sqrt{(K\omega + v_b)^2 + 4R(V_{ECU}I_{slim} - R_c I_{slim}^2)}\right),$$

where K is a back-EMF constant of the brushed DC motor, R is a winding resistance of the brushed DC motor, ω is a speed of the brushed DC motor, $v_b$ is a brush voltage drop across a set of brushes of the brushed DC motor, $V_{ECU}$ is a controller supply voltage, $I_{slim}$ is the supply current limit, and $R_c$ is a controller resistance.

5. The method of claim 1, wherein the final torque limit is based on the second torque limit.

6. The method of claim 5, wherein determining the final torque limit includes calculating the second torque limit based on at least one of: a maximum torque limit ($\tau_{MAX}$) in accordance with:

$$\tau_{MAX} = \frac{K}{R}(V_{MAX} - K\omega - v_b),$$

or a minimum torque limit ($\tau_{MIN}$) in accordance with:

$$\tau_{MIN} = \frac{K}{R}(-V_{MAX} - K\omega - v_b),$$

where K is a back-EMF constant of the brushed DC motor, R is a winding resistance of the brushed DC motor, $V_{MAX}$ is the maximum available voltage value, ω is a speed of the brushed DC motor, and $v_b$ is a brush voltage drop across a set of brushes of the brushed DC motor.

7. The method of claim 1, further including determining a third torque limit based on a motor current not exceeding a maximum motor current value, and
wherein determining the final torque limit is further based on the third torque limit.

8. The method of claim 1, further including:
integrating a value for determining the torque command; and
pausing integrating the value in response to setting the limited torque command based on the final torque limit.

9. The method of claim 1, wherein determining the torque limit includes:
determining a first maximum torque limit based on the supply current value not exceeding the supply current limit;
determining a second maximum torque limit based on the controller supply voltage value not exceeding the maximum available voltage;
determining a final maximum torque limit based on a lowest one of a plurality of maximum torque limits including, at least, the first maximum torque limit and the second maximum torque limit;
determining a first minimum torque limit based on the supply current value not exceeding the supply current limit;
determining a second minimum torque limit based on the controller supply voltage value not exceeding the maximum available voltage value; and
determining a final minimum torque limit based on a highest one of a plurality of minimum torque limits including, at least, the first minimum torque limit and the second minimum torque limit, and
wherein the final torque limit includes each of the final maximum torque limit and the final minimum torque limit.

10. The method of claim 1, wherein the brushed DC motor is an actuator motor configured to control a position of a handwheel of a steering system in a vehicle.

11. A motor control system, comprising:
a brushed direct current (DC) motor having a set of brushes;
a voltage regulator configured to apply a DC voltage to the brushed DC motor based on a voltage command; and
a controller configured to:
determine, based on one of a motor current command or an actual motor current, a brush voltage drop across the set of brushes of the brushed DC motor;
determine, based on the brush voltage drop, at least one of: a first torque limit based on a supply current value not exceeding a supply current limit, and a second torque limit based on a controller supply voltage value not exceeding a maximum available voltage;
determine a final torque limit based on the at least one of the first torque limit and the second torque limit;
determine a limited torque command based on a torque command and not to exceed the final torque limit;
determine a voltage command based on the limited torque command; and
transmit the voltage command to the voltage regulator.

12. The system of claim 11, wherein determining the brush voltage drop includes computing the brush voltage drop in accordance with:

$$v_b = \text{sign}(i) * V_0\left(1 - e^{-\left|\frac{i}{I_0}\right|}\right),$$

where $v_b$ is the brush voltage drop, i is the one of the motor current command or the actual motor current, and $V_0$ is a brush voltage parameter, and $I_0$ is a brush current parameter.

13. The system of claim 11, wherein the final torque limit is based on the first torque limit.

14. The system of claim 13, wherein determining the final torque limit includes calculating the first torque limit based on at least one of: a maximum torque limit ($\tau_{MAX}$) in accordance with:

$$\tau_{MAX} = \frac{K}{2R}\left(-(K\omega + v_b) + \sqrt{(K\omega + v_b)^2 + 4R(V_{ECU}I_{slim} - R_cI_{slim}^2)}\right),$$

or a minimum torque limit ($\tau_{MIN}$) in accordance with:

$$\tau_{MIN} = \frac{K}{2R}\left(-(K\omega + v_b) - \sqrt{(K\omega + v_b)^2 + 4R(V_{ECU}I_{slim} - R_cI_{slim}^2)}\right),$$

where K is a back-EMF constant of the brushed DC motor, R is a winding resistance of the brushed DC motor, $\omega$ is a speed of the brushed DC motor, $v_b$ is a brush voltage drop across a set of brushes of the brushed DC motor, $V_{ECU}$ is a controller supply voltage, $I_{slim}$ is the supply current limit, and Re is a controller resistance.

15. The system of claim 11, wherein the final torque limit is based on the second torque limit.

16. The system of claim 15, wherein determining the final torque limit includes calculating the second torque limit based on at least one of: a maximum torque limit ($\tau_{MAX}$) in accordance with:

$$\tau_{MAX} = \frac{K}{R}(V_{MAX} - K\omega - v_b),$$

or a minimum torque limit ($\tau_{MIN}$) in accordance with:

$$\tau_{MIN} = \frac{K}{R}(-V_{MAX} - K\omega - v_b),$$

where K is a back-EMF constant of the brushed DC motor, R is a winding resistance of the brushed DC motor, $V_{MAX}$ is the maximum available voltage value, $\omega$ is a speed of the brushed DC motor, and $v_b$ is a brush voltage drop across a set of brushes of the brushed DC motor.

17. The system of claim 11, wherein the controller is further configured to determine a third torque limit based on a motor current not exceeding a maximum motor current value, and
wherein determining the final torque limit is further based on the third torque limit.

18. The system of claim 11, wherein the controller is further configured to:
integrate a value for determining the torque command; and
pause integrating the value in response to setting the limited torque command based on the final torque limit.

19. The system of claim 11, wherein determining the torque limit includes:
determining a first maximum torque limit based on the supply current value not exceeding the supply current limit;
determining a second maximum torque limit based on the controller supply voltage value not exceeding the maximum available voltage;
determining a final maximum torque limit based on a lowest one of a plurality of maximum torque limits including, at least, the first maximum torque limit and the second maximum torque limit;
determining a first minimum torque limit based on the supply current value not exceeding the supply current limit;
determining a second minimum torque limit based on the controller supply voltage value not exceeding the maximum available voltage value; and
determining a final minimum torque limit based on a highest one of a plurality of minimum torque limits including, at least, the first minimum torque limit and the second minimum torque limit, and
wherein the final torque limit includes each of the final maximum torque limit and the final minimum torque limit.

20. The system of claim 11, wherein the brushed DC motor is an actuator motor configured to control a position of a handwheel of a steering system in a vehicle.

\* \* \* \* \*